(12) United States Patent
Sato et al.

(10) Patent No.: US 6,954,318 B2
(45) Date of Patent: Oct. 11, 2005

(54) MAGNETIC DATA EMBEDDING APPARATUS HAVING CHECKING FUNCTION

(75) Inventors: Narumi Sato, Nagano (JP); Kiminori Sato, Nagano (JP)

(73) Assignee: Fuji Electric Holdings Co., Ltd., Tokyo (JP)

( * ) Notice: Subject to any disclaimer, the term of this patent is extended or adjusted under 35 U.S.C. 154(b) by 43 days.

(21) Appl. No.: 10/776,634

(22) Filed: Feb. 12, 2004

(65) Prior Publication Data

US 2004/0218299 A1 Nov. 4, 2004

(51) Int. Cl.$^7$ .............................. G11B 5/02; G11B 27/36
(52) U.S. Cl. .................. 360/31; 360/69; 360/77.02; 360/77.05; 360/77.08; 360/78.14; 360/75
(58) Field of Search .................. 360/15–17, 75, 360/39, 31, 51, 55, 69, 77.02, 77.05, 77.08, 78.14, 78.12, 78.04

(56) References Cited

U.S. PATENT DOCUMENTS

| | | | |
|---|---|---|---|
| 6,704,156 B1 * | 3/2004 | Baker et al. | 360/75 |
| 2003/0137765 A1 * | 7/2003 | Yamazaki et al. | 360/39 |
| 2005/0073762 A1 * | 4/2005 | Sato et al. | 360/51 |

FOREIGN PATENT DOCUMENTS

| | | |
|---|---|---|
| JP | 05-189895 | 7/1993 |
| JP | 08-235801 | 9/1996 |
| JP | 09-288873 | 11/1997 |
| JP | 10-172254 | 6/1998 |
| JP | 2001-216750 | 8/2001 |

* cited by examiner

Primary Examiner—David Hudspeth
Assistant Examiner—Natalia Figueroa
(74) Attorney, Agent, or Firm—Rabin & Berdo, P.C.

(57) ABSTRACT

Rotary positioners integrally and pivotally stack a read magnetic head for reading a master disk and servo heads for writing to each surface of magnetic disks, the master disk and magnetic disks being stacked on a shaft of a spindle motor. Every surface of every magnetic disk is written by the servo heads in parallel while sharing a range of tracks. Simultaneously with the writing, checking magnetic heads stacked on a checking-dedicated rotary positioner read written data on the master disk and on each surface of the magnetic disks. A comparison logic circuit compares the read data from the magnetic disk surfaces with the data from the master disk. If an inconsistency is found, the contents of the master disk are overwritten on the corresponding magnetic disk surface through a correction servo pattern generator by the checking magnetic head.

4 Claims, 8 Drawing Sheets

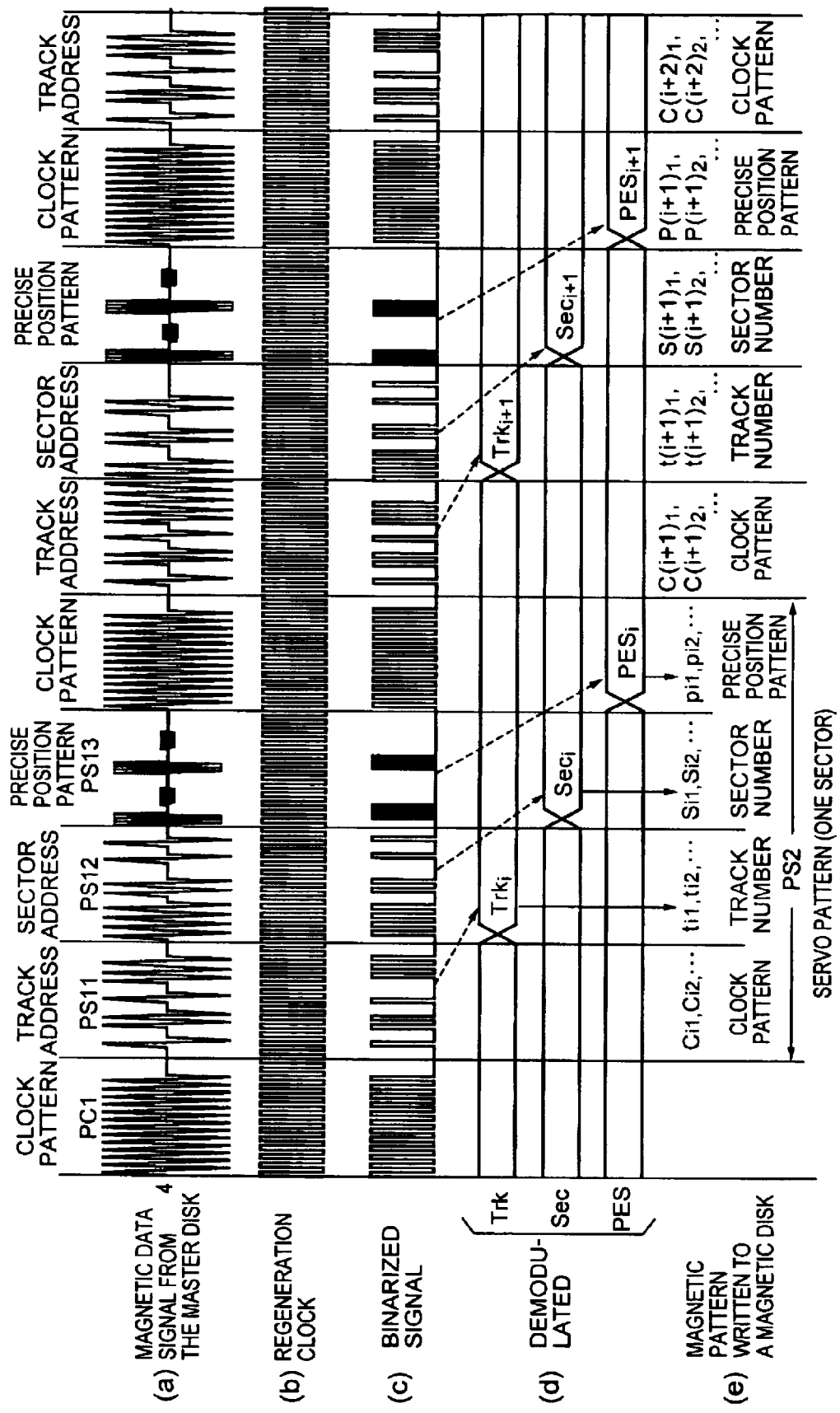

MAGNETIC DATA EMBEDDING APPARATUS HAVING CHECKING FUNCTION

CROSS-REFERENCE TO RELATED APPLICATIONS

The entire disclosure of the inventors' corresponding Japanese patent application, Serial No. JP PA 2003-071929 filed Mar. 17, 2003, is incorporated by reference.

BACKGROUND OF THE INVENTION

1. Field of the Invention

The invention relates to a magnetic data embedding apparatus to write magnetic data (or embedded data) into a magnetic disk. More particularly, the invention relates to such an apparatus, which includes a servo pattern for detecting a magnetic head position, an ID pattern for identifying a magnetic disk, and a program into a virgin or unwritten magnetic disk.

In more detail, a magnetic data embedding apparatus according the invention is used in connection with writing data into a magnetic disk to meet customer requirements and so produce a product magnetic disk. The magnetic data embedding apparatus is also called a disk servo writer. Such a magnetic data embedding apparatus includes a master disk and a plurality of magnetic disks all stacked together onto the shaft of a spindle motor. The apparatus writes the embedded data on the surfaces of each magnetic disk based on magnetic data that is read out of the master disk. The magnetic data is read out to all of the magnetic disks simultaneously through magnetic heads disposed in such a way that a respective plurality of the magnetic heads is arranged on each magnetic disk surface.

According to an aspect of the invention, a magnetic data embedding apparatus has a checking function, in which the checking is executed for the embedded data written on the magnetic disk with the magnetic data on the master disk, and correction is performed for errors if detected, simultaneously with the writing operation.

2. Description of the Related Art

FIG. 9 shows a schematic arrangement of areas of magnetic data that are embedded (or written) on a virgin magnetic disk 1. Servo pattern embedding areas PS2 are arranged radially with an equal spacing (or in a sector spacing) on both sides of the magnetic disk 1. Data areas DTA are provided for an ID patterns for disk identification or for programs that are written on a customer's request at a time of manufacturing the magnetic disk 1. The data areas DTA also are provided for data that are written by a user after production of the magnetic disk 1.

The servo pattern PS2 consists of information for sensing the actual position of the magnetic head over the magnetic disk 1 during apparatus operation. The information includes a clock pattern for generating a synchronous clock and coordinate information such as a track address and a sector address.

FIGS. 7A and 7B show an example of a structure of a conventional magnetic data embedding apparatus 101 for writing a servo pattern PS2 on a magnetic disk 1. This magnetic data embedding apparatus comprises a disk stack unit DSU consisting of a stack of M (nine in FIG. 7B) magnetic disks 1 and a clock pattern disk 2K stacked coaxially therebelow. The DSU is fixed to the shaft of a spindle motor SPM and rotated at a high speed.

On the clock pattern disk 2K, a clock pattern PC0 is written on the outermost circumference, for example as shown in FIG. 8, on a virgin magnetic disk 1 using this apparatus 101, before writing servo pattern PS2 on the magnetic disk 1. The servo pattern PS2 is written on the magnetic disk 1, synchronizing with the clock that is obtained by reading out the clock pattern PC0.

A clock head 3K writes and reads a clock pattern PC0 directly to and from the clock pattern disk 2K. A clock head positioner 11K holds and positions the clock head 3K at a fixed position of the outermost circumference of the clock pattern disk 2K in the example of FIG. 7. The symbol 9K represents a clock pattern generator that generates signals of the clock pattern PC0 to write on the clock pattern disk 2K.

Servo heads 3 corresponding to each medium surface of the M magnetic disks 1 and write servo patterns PS2 directly on the medium surfaces. A rotary positioner 11 holds and stacks the servo heads 3, and oscillates around the shaft 11a to move the servo head 3 to a desired radial position on the magnetic disk 1.

An encoder 18 is fixed coaxially with the rotary positioner 11 and detects an angular position thereof. A position detection section 19 obtains a radial position (an analogue value) of the servo head 3 on the magnetic disk from the angular position detected by the encoder 18.

Servo compensator 7 and power amplifier 8, together with the encoder 18 and the position detection section 19, constitute a feedback loop that controls positioning of the servo heads 3 through the rotary positioner 11 in the radial direction on the magnetic disk. That is, the feedback loop serves, for a desired track, to position the servo heads 3 relative to the center of the disk in the radial direction.

The servo compensator 7 receives and amplifies an error signal between a target head position $\rho_s$ and a detected head position $\rho$ of the servo head 3 and obtains the value of a servo compensation necessary to minimize the error. Here, the target head position $\rho_s$ is an analogue value corresponding to a radius of the target track and the detected head position ? is the actual radial position of the servo head 3 that is output from the position detection section 19. The power amplifier 8 outputs electric current for driving the rotary positioner 11 according to the obtained servo compensation value, to move the servo heads 3.

The servo pattern generator 9 generates servo pattern PS2 while receiving the clock from the clock head 3K, and supplies the generated servo pattern PS2 to each of the servo heads 3 stacked on the rotary positioner 11.

Next, the operation of the apparatus of FIG. 7 as a whole will be described. First, the clock head 3K records clock pattern PC0 generated by the clock pattern generator 9K at a desired radial position (at the outermost circumference in the example of FIG. 8) on the clock pattern disk 2K.

The actual radial position $\rho$ of the servo head 3 is detected by the encoder 18 that is coaxial with the rotary positioner 11, and the position detection section 19. The amount of error between the detected head position $\rho$ and the target head position $\rho_s$ is fed back through the servo compensator 7 and the power amplifier 8 to the rotary positioner 11 thereby to move the servo heads 3 to the target position $\rho_s$.

In this state, each of the servo heads 3 simultaneously writes servo patterns PS2 generated by the servo generator 9 on the corresponding surface of the magnetic disk 1. Such writing is synchronized with the clock that is read out of the clock pattern disk 2K through the clock head 3K. In addition to the servo pattern, ID data, programs, and other data are also written onto the data area DTA of the magnetic disk 1 by the servo heads 3 through the servo pattern generator 9, while synchronizing with the clock that is read out of the clock pattern disk 2K.

Japanese Unexamined Patent Application Publication No. H5-189895 discloses a magnetic disk device comprising first and second access mechanisms, one of which writes data and the other of which reads and checks the data. Japanese Unexamined Patent Application Publication No. H9-288873 discloses a magnetic disk device comprising two magnetic heads, both of which access one magnetic disk surface, one of the two being dedicated to a regeneration operation only.

Japanese Unexamined Patent Application Publication No. H10-172254 discloses a technique with which a servo pattern read out of a master surface of a medium is written on medium surfaces excepting the master surface in a magnetic disk device comprising a plurality of medium surfaces. Japanese Unexamined Patent Application Publication No. H8-235801 and Japanese Unexamined Patent Application Publication No. 2001-216750 discloses a technique, in which a magnetic disk device or a disk servo writer writes servo information on a plurality of magnetic disk surfaces at the same time.

The conventional magnetic embedding apparatus described above, which is usually called a disk servo writer, simultaneously writes servo patterns generated by the servo pattern generator on the stacked magnetic disks, while synchronizing with the clock pattern recorded in advance on a clock pattern disk. The time required for writing on the entire disk surface of all disks in one disk stack unit is equal to the time for one revolution of the disks times the number of tracks to be written in each disk.

With increases in track density on magnetic disks, the time required for the writing operation increases, resulting in lower throughput. Since the track pitch decreases, more accurate writing is needed, and it becomes important to check the written pattern. This checking time also increases like the writing time, thus further decreasing the throughput.

By increasing the rotational speed of disks, the time for writing and checking can be reduced, but such increases in speed increases mechanical vibration. The vibration makes it difficult to write accurate servo pattern. Thus, there is tradeoff between speed and vibration.

If the number of magnetic disks in a stack is increased, while the throughput is enhanced, the load on the spindle motor increases. This causes precision of rotation to deteriorate. Since the number of stacked magnetic heads must also increase, it becomes difficult to assure that a specified degree of accuracy is reached in attaching the magnetic heads.

A conventional apparatus for embedding magnetic data employs a rotary encoder for detecting the position of the magnetic head. As recording density increases, the required accuracy in detecting the position of the magnetic heads may exceed the resolution precision of the rotary encoder. Therefore, a means for providing higher accuracy in position detection is needed.

OBJECTS AND SUMMARY OF THE INVENTION

Accordingly, an object of the invention is to provide a magnetic data embedding apparatus having a checking function, that provides increased accuracy in writing magnetic data on a stack of magnetic disks by virtue of having an accuracy in position detection not limited by a degree of resolution of a rotary encoder, and that allows the time for the processes from the start of writing to the end of checking to be reduced. Such an apparatus must provide these improvements without a reduction in either the rotational speed of the magnetic disks or the number of magnetic disks in the stack.

To solve the problems, the magnetic data embedding apparatus of the invention includes a master magnetic disk and a plurality of object magnetic disks that are stacked on a shaft of a spindle motor. In more detail, the magnetic data embedding apparatus according to the invention includes a master magnetic disk with magnetic data containing servo information written on at least one of its surfaces and a plurality of object magnetic disks in which information is written, the master disk and the object disks being stacked and integrally installed on the shaft of the spindle motor (SPM). The apparatus also includes one or more read magnetic heads disposed on the master disk and a plurality of servo heads disposed on every surface of the object disks. The plurality of servo heads write embedded data based on the magnetic data that is read out from the master disk by the read magnetic head onto the surfaces of the object magnetic disks in parallel while sharing a range of tracks.

The apparatus of the invention further includes a plurality of rotary positioners disposed around the magnetic disks. These include at least one writing-dedicated rotary positioner. The writing-dedicated positioner or positioners stack and hold integrally and pivotally one or more read magnetic heads and one or more write magnetic heads. The read magnetic heads read out the magnetic data on the master disk. One or a predetermined number of the write magnetic heads are provided in correspondence to each surface of the object magnetic disks for accessing the surface. Each writing-dedicated rotary positioner is provided so that a plurality of the write magnetic heads can access every surface of the object magnetic disks. Each write magnetic head belonging to the one, or one of the write-dedicated rotary positioners writes the magnetic data that is read out by the read magnetic head disposed on the master magnetic disk or magnetic data made from the magnetic data that is read out from the master disk (hereinafter the two types of magnetic data are collectively referred to as embedded data) onto one surface of the object magnetic disk corresponding to the write magnetic head. In one embodiment, this writing is performed in such a way that another write magnetic head corresponding to the same surface of the object magnetic disk and belonging to the same or another writing-dedicated rotary positioner writes the embedded data in parallel while sharing a range of tracks.

The apparatus further comprises one or defined plurality of checking magnetic heads disposed on one surface of the master disk and every surface of the object disks. The checking magnetic head disposed on the master disk reads the magnetic data on the master disk, and the checking magnetic heads disposed on the object disks read the embedded data on the corresponding surface of the object disks, while the servo heads are writing embedded data on the object disks.

In more detail, the magnetic data embedding apparatus includes one or more checking-dedicated rotary positioners disposed around the magnetic disks. Each such positioner stacks and holds integrally and pivotally a first type checking head and second type checking heads. The first type checking head reads out the magnetic data on the master disk for checking. Each second type checking head is provided in correspondence to one surface of the object disks for checking and reading out the embedded data corresponding to the magnetic data that is read out from the master disk by the first type checking head. The magnetic data that is read out from the master disk is compared with the embedded data that is read out from the object disks, and errors, if any, are corrected.

In more detail, the magnetic data embedding apparatus additionally includes, corresponding to each surface of the object disks, a comparison means (including a comparison logic circuit and a CPU). The comparison means compares the embedded data read out from the surface of the object disk by the second type checking head, with the magnetic data read out by the first type checking head simultaneously with writing operation of the write magnetic heads. Thus, the contents in the master disk can be exactly written on every object magnetic disks. Moreover, the total time required by the processes from start of writing to end of checking can be reduced.

The magnetic data embedding apparatus advantageously also includes an overwriting means, including a correction servo pattern generator and a CPU. The overwriting means overwrites onto the object disks, the embedded data corresponding to the magnetic data read out by the first type checking heads. The overwriting is performed through the second type checking heads disposed on the surfaces of the object disk when the comparison means detects an inconsistency. Such overwriting is performed simultaneously with the writing operation of the write magnetic heads.

BRIEF DESCRIPTION OF THE DRAWINGS

FIG. 6 is a timing chart illustrating an example of operation of the writing side functional sections shown in FIG. 1B.

DETAILED DESCRIPTION OF THE PREFERRED EMBODIMENTS

Figure 1:
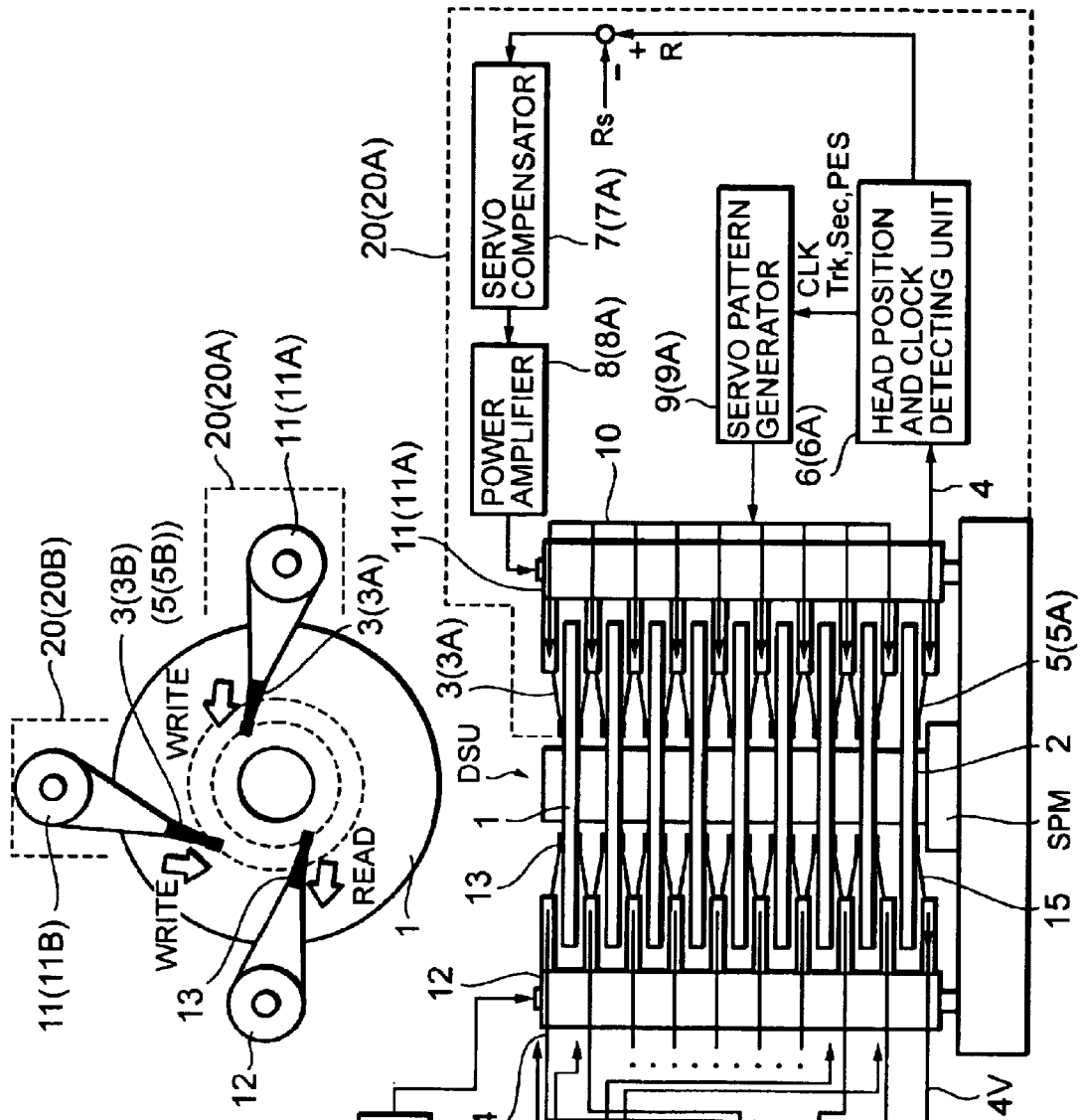
FIGS. 1A and 1B show a schematic construction of a first embodiment of a magnetic data embedding apparatus having checking function according to the invention.

In the drawings, the same symbol represents the same or an equivalent part. FIGS. 1A and 1B show a constitution of an example of a magnetic data embedding apparatus having checking function according to a first aspect of the invention. The apparatus of the FIG. 1 includes a disk stack unit DSU in which a master disk 2 (at the bottom) and M (M=9 in FIG. 1) magnetic disks 1 are stacked. The DSU is attached integrally to the shaft of a spindle motor SPM running at a high rotational speed.

The master disk 2 is prepared by writing accurate servo patterns and a clock pattern, which will be described below referring to FIGS. 4 and 5, for every sector on a virgin magnetic disk that is similar to the magnetic disks 1.

Rotary positioners 11A and 11B hold and pivot magnetic heads for access to the disk stack unit DSU. The rotary positioners 11A and 11B are for writing magnetic data to the magnetic disks 1, and are referred to as "writing side" or "writing-dedicated" rotary positioners.

A rotary positioner 12 also holds and pivots magnetic heads for access to the disk stack unit DSU. The rotary positioner 12 checks and corrects the magnetic data written on the magnetic disks 1 and is referred to as a "checking side" rotary positioner or a "checking-dedicated" rotary positioner.

Description first will be made of the sections relating to the writing operation. One of the writing side rotary positioners 11A holds a read magnetic head 5A that directly accesses a surface of the master disk 2, in particular the downward surface of the master disk, in the example of FIGS. 1A and 1B, and servo heads 3A that directly access every surface of the M sheets of magnetic disks 1. Likewise, the other writing side rotary positioner 11B holds a read magnetic head 5B that directly accesses the downward surface of the master disk 2, and servo heads 3B that directly access every surface of the M magnetic disks 1.

The writing side rotary positioners 11A and 11B, together with accompanying circuits, construct two head stack servo units 20A and 20B. Although the apparatus of FIGS. 1A and 1B has two head stack servo units 20, one or more additional head stack servo units 20 may be added. The head stack servo unit 20A comprises functional sections as described below.

Figure 4:
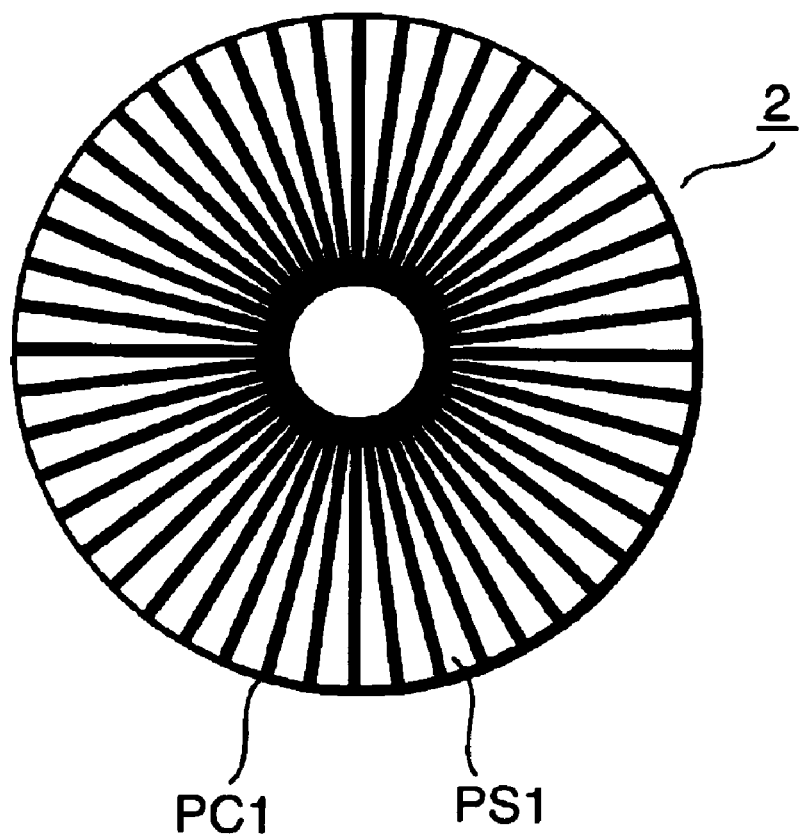
FIG. 4 shows schematically an example of arrangement of servo information regions on the master disk in FIGS. 1B through 3.

The read magnetic head 5A reads out magnetic data 4, which data consists of the clock pattern PC1 and the servo pattern PS1 shown in FIG. 4, from the downwardly facing surface of the master disk 2. A section 6A for detecting the head position and the clock (hereinafter also head position and clock detecting section 6A) detects synchronization clock CLK, position information regarding the read magnetic head 5A, and sensed head position R based on the magnetic data 4 that is read out by the read magnetic head 5A. The clock CLK will be described later referring to FIG. 6. The position information regarding the read magnetic head 5A includes a track address Trk, a sector address Sec, and a precise position PES in the disk radial direction defined within a track. The detected head position R is a precise radial position of the read magnetic head 5A on the master disk 2, obtained from the above-mentioned position information.

A servo pattern generator 9A generates a servo pattern PS2 of magnetic pattern signals 10 that are written on each surface of the magnetic disks 1 by a servo head 3A corresponding to the surface based on the position information of the read magnetic head 5A, while synchronizing with the clock CLK. Each of the servo heads 3A writes the servo pattern PS2 generated by the servo pattern generator 9A on each surface of the magnetic disks 1. The rotary positioner 11A rotates and positions the read magnetic head 5A and the servo heads 3A.

A servo compensator 7A determines an amount of servo compensation that will minimize the magnitude of error between a target position Rs and a detected position R of the read magnetic head 5A detected by the section 6A for detecting head position and clock. A power amplifier 8A outputs driving electric current for the rotary positioner 11A based on the determined amount of servo compensation. The read magnetic head 5A opposing one surface of the master disk 2 and the servo heads 3A opposing corresponding surfaces of the magnetic disks 1 are attached to the rotary positioner 11A such that every head can access to the position of the same radius on the corresponding disk surface.

The head stack servo unit 20B also has the same functional sections as the head stack servo unit 20A. The head stack servo unit 20B includes a read magnetic head 5B that reads the magnetic data 4 from the downwardly facing surface of the master disk 2. It also includes servo heads 3B that write servo patterns PS2 of magnetic pattern signals 10 generated from the magnetic data 4 read out by the read magnetic head 5B, and other means that are not explicitly drawn in FIGS. 1A and 1B. The read magnetic head 5B opposing one surface of the master disk 2 and the servo heads 3B opposing corresponding surface of the magnetic disks 1 are attached to the rotary positioner 11B such that every head can access the position of the same radius on the corresponding disk surface.

FIG. 4 shows schematically an example of arrangement of pattern regions on a master disk 2. FIG. 5 shows an example of detailed structure of the patterns on one track of the master disk 2. Line (a) of FIG. 5 shows examples of specific structures of the clock pattern PC 1 and the servo pattern PS1. Line (b) of FIG. 5 shows waveforms of magnetic data signals 4 read out from the pattern of line (a). Of the magnetic data signals 4 in line (b) of FIG. 5, a positive pulse is generated at the left edge of the stripe of the pattern of line (a), and the negative pulse is generated at the right edge.

Figure 5:
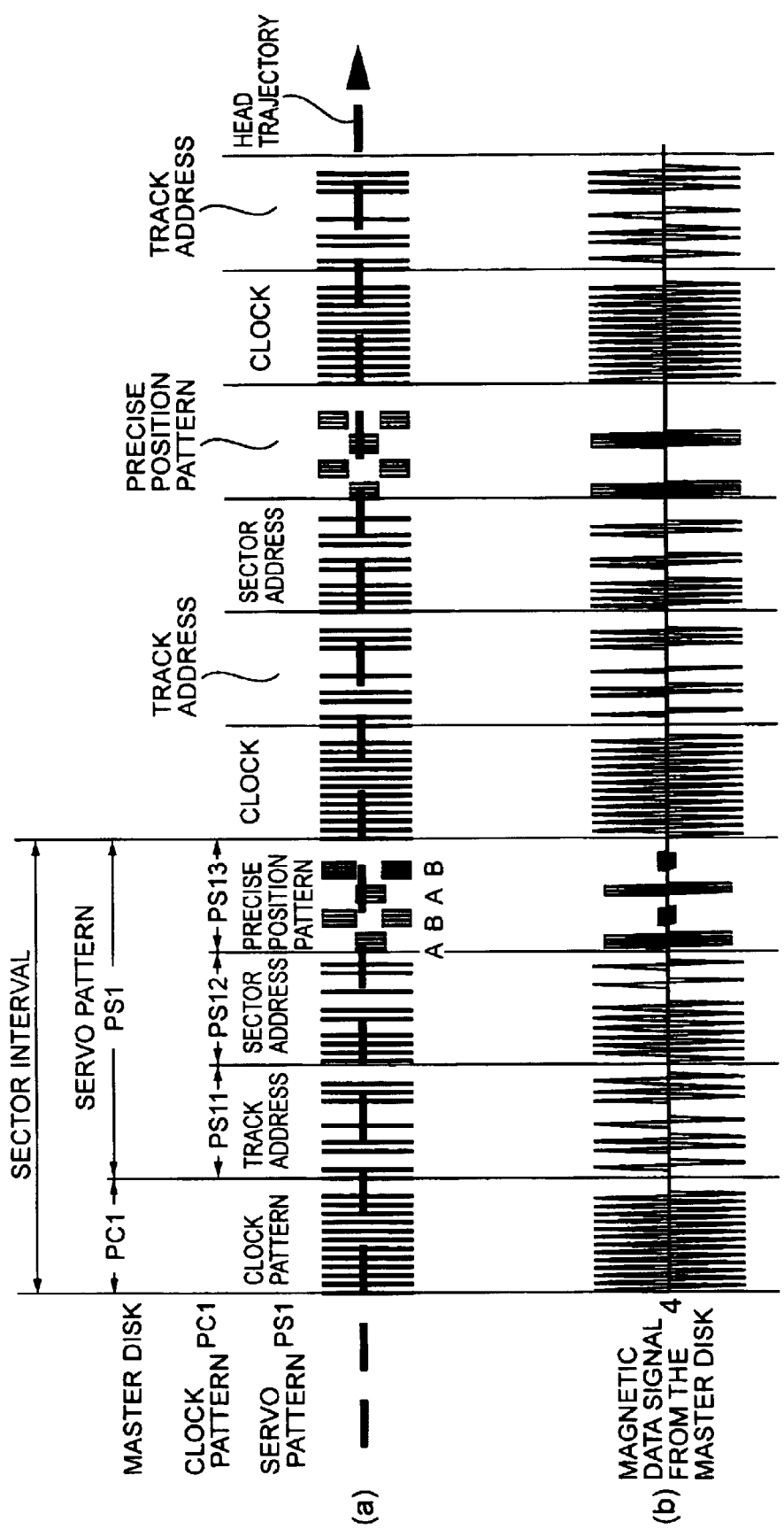
FIG. 5 shows an example of detailed structure of the servo information regions on the master disk shown in FIG. 4.
Figure 7A:
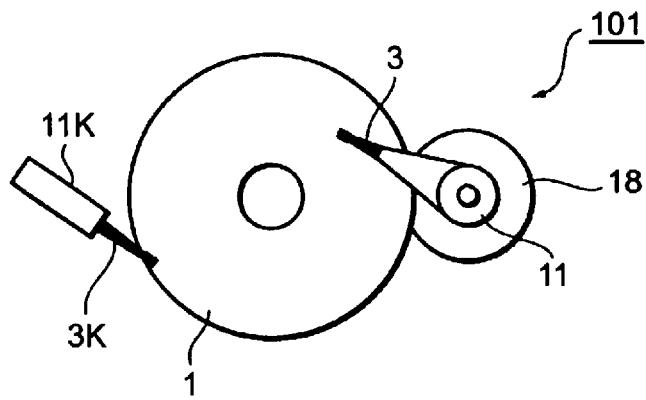
FIGS. 7A and 7B show a schematic construction of a conventional example of a magnetic data embedding apparatus.
Figure 7B:
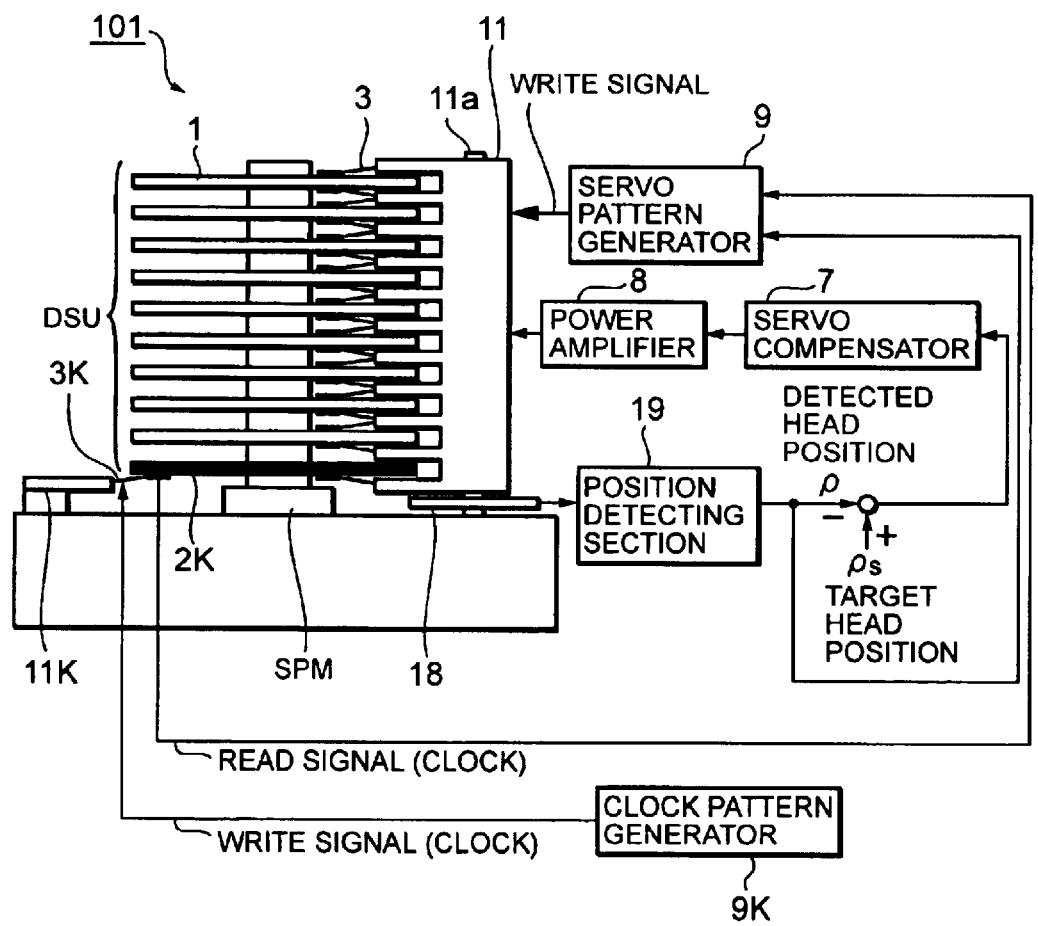
Figure 8:
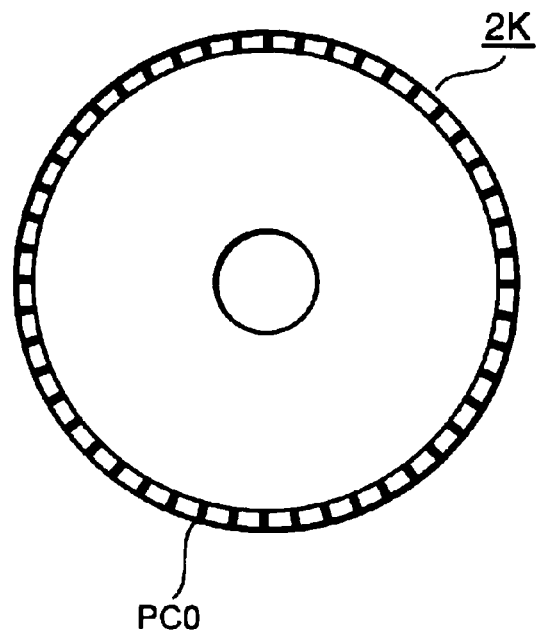
FIG. 8 shows a schematic structure of a clock pattern disk used in the magnetic data embedding apparatus of FIGS. 7A and 7B.

As shown in FIGS. 4 and 5, every sector of the master disk 2 includes clock patterns PC 1 and servo patterns PS2 with high precision, written by magnetic duplication or a magnetic head. A servo pattern PS1 of each sector in this example consists of three patterns in the sequence along the scanning direction (the orbit of the head being represented by the dotted line). These include a pattern PS 11 of a track address (or track number, "Trk" described later), a pattern PS12 of a sector address (or sector number, "Sec" described later), and a pattern PS13 of a precise position ("PES" described later).

The precise position pattern PS13 is a staggered pattern, which is used in most magnetic disk devices. The magnetic pattern of the precise position pattern PS13 uses the change of the amplitude of the signals generated at the A portion or the B portion in FIG. 5(a), depending on the precise orbit of the magnetic head, and determines the precise radial position (also referred to simply as precise position) PES (position error signal) within the track. The PES is defined by the following equation.

PES=(amplitude of signal from portion A−amplitude of signal from portion B)/(amplitude of signal from portion A+amplitude of the signal from portion B) (1)

The contents written on the master disk 2 are restricted to the clock patterns PC1 and the servo patterns PS1 for every sector. Consequently, the master disk need not provide a data area DTA, which is not the case of a magnetic disk 1 in which servo pattern PS2 is written. As a result, the clock pattern PC1 and the servo pattern PS1 can be written on the whole surface of a master disk, thereby enhancing the accuracy of the head position.

FIG. 6 is a timing chart illustrating operation of the writing side functional sections of a magnetic data embedding apparatus having checking function according to the first embodiment. Line (a) of FIG. 6 is the same as line (b) of FIG. 5, and shows the magnetic data signals 4 from the master disk 2. Line (b) of FIG. 6 shows clock CLK regenerated from the portion of the clock pattern PC1 in the magnetic data signals 4. Line (c) of FIG. 6 shows binarized signals of the magnetic data signals 4. Line (d) of FIG. 6 shows track address Trk, sector address Sec, and precise position PES that are detected (demodulated) from the binarized signals of line (c) of FIG. 6. Line (e) of FIG. 6 shows magnetic pattern signals 10 being written to the magnetic disk 1.

Operation of the writing side sections in FIG. 1B will be described with reference to FIG. 6. The operation is performed by the head stack servo unit 20A or 20B in the range of tracks that is assigned to the servo unit 20A or the servo unit 20B, respectively. The clock patterns PC1 and the servo patterns PS1 written in the master disk 2 are read by the read magnetic heads 5A and 5B to detect the actual radial position R of the read magnetic head 5. The amount of error between the actual position R and the target position Rs is fed back through the servo compensator 7 and the power amplifier 8. With the feedback, the read magnetic head 5 is moved to the target position as the settled position thereof, which is the stabilized position after completion of transient movement of positioning control. Consequently, the radial position over the magnetic disk surface of each servo head 3 that is fixed coaxially with the read magnetic head 5 also corresponds to the target position. Each of the servo heads 3 writes, in unison, servo pattern PS2 on each surface of the magnetic disks opposed by the servo head following the passage of successive lines.

In the "following up state" of operations (in which the position of the magnetic head is corrected to the target position), the head position and clock detecting section 6 (specifically, the demodulation circuit 22 (See FIG. 2)) regenerates the clock CLK (line (b) in FIG. 6) from the clock pattern PC1 in the magnetic data signals 4 (line (a) of FIG. 6) obtained from the master disk 2. Synchronizing with the clock CLK, the track address Trki, the sector address Seci, and the precise position PESi (position error signal) shown in line (d) of FIG. 6 are detected from the binary signals (line (d) of FIG. 6) obtained by binarizing the magnetic data signals 4. The suffix "i" added to the symbol Trk, Sec, or PES represents the sequence of scanning sectors along the track.

In the following up state, the head position and clock detecting section 6 (more specifically the head position detection circuit 16 (See FIG. 2)) determines a detected head position R of the settled position of the read magnetic head 5 from a predetermined track pitch W, the track address Trki, the sector address Seci, and the precise position PESi by the equation below. That is, the settled position R in a sector address is given by:

Seci=Trki×W+PESi (2)

Figure 9:
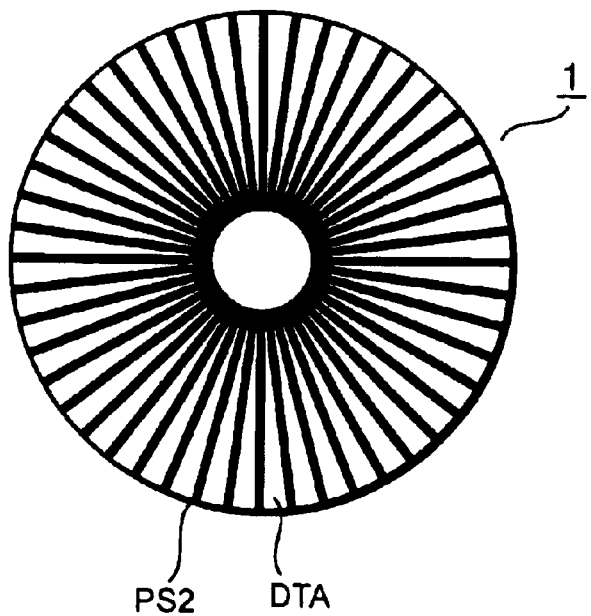
FIG. 9 shows a schematic arrangement of magnetic data regions on a magnetic disk.

The servo pattern generator 9 generates magnetic pattern signals 10 to be written on the magnetic disks 1 based on the track address Trk, the sector address Sec, and the precise position PES that are detected by the head position and clock detecting section 6 as described above. The magnetic pattern signals 10 as shown in line (e) of FIG. 6 consisting of clock patterns ci1, ci2, ci3, . . . , track address patterns ti1, ti2, ti3, . . . , precise position patterns si1, si2, si3, . . . , and precise position patterns pi1, pi2, pi3, . . . are written on the respective area of the servo pattern PS2 of a magnetic disk 1 as shown in FIG. 9 through the servo heads 3.

The above-described operation is executed by the rotary positioners 11A and 11B, sharing the range of tracks to be written by each positioner at the same time. The writing operation is performed by N sets of head stack servo units 20 using N servo heads, three for each surface of each of the magnetic disks 1. Therefore the time for servo writing is reduced to 1/N.

Figure 2:
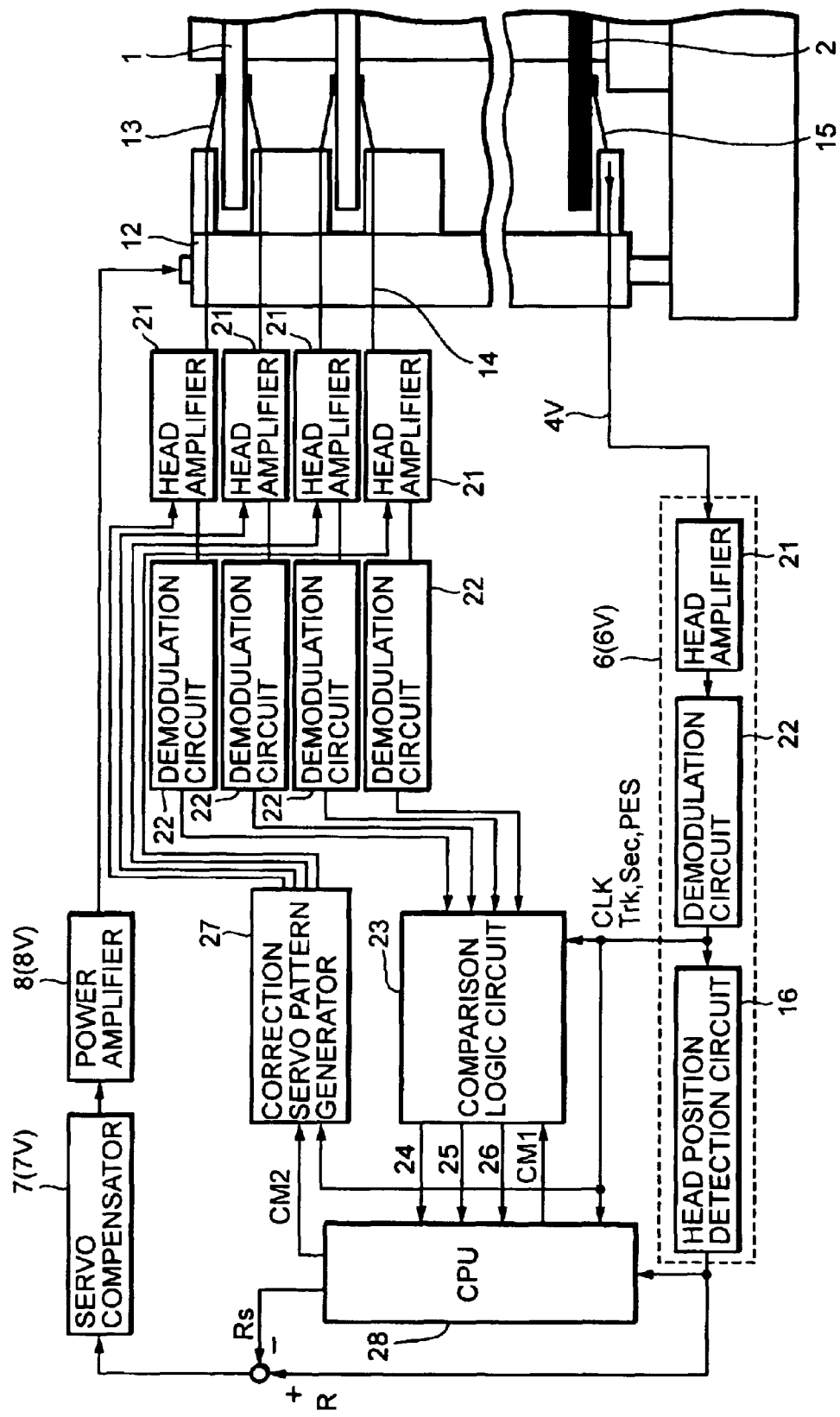
FIG. 2 shows detailed construction of the functional sections on the checking side of the embodiment shown in FIGS. 1A and 1B.

Next, description is made of the functional sections on checking side in FIG. 1. FIG. 2 shows the detailed construction of the functional sections on the checking side of FIG. 1. The checking-dedicated rotary positioner 12 in FIGS. 1 and 2 stacks and holds a checking magnetic head 15 and checking magnetic heads 13. The checking magnetic head 15 is a magnetic head that directly accesses the downwardly facing surface, in this example, of the master disk 2. The checking magnetic heads 13 are magnetic heads, each of which directly accesses each surface of the M magnetic disks 1.

The checking magnetic head 15 opposite to the master disk 2 and the checking magnetic heads 13 each opposite to the corresponding surface of the magnetic disks 1, are adjusted to access the same radius on the master disk 2 and the magnetic disks 1, respectively.

The various means in FIG. 2 depicted at the left side of the checking-dedicated rotary positioner 12 are the circuits involved with that positioner. The head position and clock detecting section 6V, the servo compensator 7V, and the power amplifier 8V in the checking side, respectively serve the same functions of the head position and clock detecting section 6A, the servo compensator 7A, and the power amplifier 8A on the writing side.

Thus, the head position and clock detecting section 6V demodulates magnetic data 4V that is read out from the master disk 2 by the checking magnetic head 15. The modulation is executed through a head amplifier 21 and a demodulation circuit 22 of the section 6V. The magnetic data 4V corresponds to the magnetic data 4 that is read out by the read magnetic head 5A. Just as described above with reference to FIG. 6, the head position and clock detecting section 6V detects clock CLK for synchronization and position information of the checking magnetic head 15 including a track address Trk, a sector address Sec, and a precise position PES in the disk radial direction within the track.

The head position and clock detecting section 6V further detects a detected head position R, through a head position detection circuit 16 thereof. The detected read position R is an actual radial position of the checking magnetic head 15 on the master disk 2 obtained from the above-mentioned position information.

Information detected by the head position and clock detecting section 6V is given to a CPU 28 that supervises and controls every section of the checking side. The clock CLK and the position information of the checking magnetic head 15 including the track address Trk, the sector address Sec, and the precise position PES, are given to a comparison logic circuit 23 and a correction servo pattern generator 27.

The servo compensator 7V and the power amplifier 8V receives a value as the amount of error between a target position Rs given by the CPU 28 and a detected position R of the checking magnetic head 15, detected by the head position and clock detecting section 6V. The checking-dedicated rotary positioner 12 is pivoted and controlled by the servo compensator and the power amplifier so that the settled position R of the checking magnetic head 15 agrees with the target position Rs, which means the track position followed up by the checking magnetic heads 15 and 13 agrees with the track position corresponding to the target position Rs.

Comparison logic circuit 23 compares servo information in the magnetic data 14 from each surface of the magnetic disks 1 with servo information in the magnetic data 4V from the master disk 2, under control of the CPU 28. The servo information, including clock CLK, track address Trk, sector address Sec, and precise position PES in the magnetic data 14 is read out by the checking magnetic head 13 for each surface (that is, for each channel) of the magnetic disks 1 and demodulated through head amplifier 21 and demodulation circuit 22 provided for each channel, before being fed to the comparison logic circuit 23. The servo information, including clock CLK, track address Trk, sector address Sec, and precise position PES in the magnetic data 4V, is read out by the checking magnetic head 15 and demodulated through head amplifier 21 and demodulation circuit 22 in the head position and clock detecting section 6V, before being fed to the comparison logic circuit 23.

Correction servo pattern generator 27 carries out two functions. One function is to generate a servo pattern upon receiving servo information including clock CLK, track address Trk, sector address Sec, and precise position PES that are output from the demodulation circuit 22 of the head position and clock detecting section 6V in synchronization with the clock CLK. Another function is to switch on or off the output of a servo pattern to a checking magnetic head 13 for each surface (that is, for each channel) of the magnetic disks 1 according to a command of the CPU 28. A servo pattern is written to a surface of a magnetic disk 1 that is selected by the on-command.

Examples of operation of the functional sections in the checking side will be described in the following, referring to FIG. 2. As described previously, the functional sections in the checking side operate in parallel or simultaneously with the functional sections in the writing side.

The CPU 28 selects a range of tracks on a surface of the magnetic disks 1 in a sequence predetermined by a means not illustrated in the FIG. 2, and sequentially checks magnetic data written in each track of the selected range of tracks. First, the CPU 28 designates a track corresponding to the turn to be checked in the selected range of tracks in which writing of magnetic data is finished. The designation of the track is made in terms of a target head position Rs, to which the checking magnetic head 15 follows up on the surface of the master disk 2. As a result, the checking magnetic head 13 also follows up the same track on the surface of the magnetic disk 1 as the track on the master disk 2.

When the CPU 28 detects that the checking magnetic head 15 is settled at the aimed track by sensing the detected head position R of the checking magnetic head 15 output from the head position detection circuit 16 of the head position and clock detecting section 6V, the CPU 28 outputs a comparison command CM1 for each channel to the comparison logic circuit 23. Receiving the command, the comparison logic circuit 23 compares the servo information from each track output by the demodulation circuit 22 for each surface (that is, for each channel) of each of the magnetic disks 1 with the servo information from the track in the master disk 2 output by the demodulation circuit 22 of the head position and clock detecting section 6V. The servo information includes clock CLK, track address Trk, sector address Sec, and precise position PES.

If an error (or inconsistency) is found, the comparison logic circuit 23 sends three error signals to the CPU 28. The three sent error signals include (1) an error channel signal 24 that indicates the magnetic disk surface including the error, (2) an error track signal 25 that indicates the track (that is followed up) including the error, and (3) an error substance signal 26 that indicates substance of the error. Upon receiving the three error signals 24, 25 and 26, the CPU 28 gives an on-off command by channel CM2 to a correction servo pattern generator 27. This turns on output of a servo pattern to the magnetic disk surface (channel), including the error. Thereby, the servo pattern is overwritten on the track by the checking magnetic head 13 for the magnetic disk surface (channel).

After the overwrite, the CPU 28 again gives a comparison command by channel CM1 to the comparison logic circuit 23. The comparison logic circuit 23 compares the magnetic data 14 overwritten on the track of the channel in the magnetic disk surface with the magnetic data 4V on the track in the master disk surface, to verify proper overwrite. When the error correction is finished on the track in every channel containing an error, the CPU 28 designates a new target value Rs for the next track to be checked. The correction operation then proceeds to the next track.

Only one checking-dedicated rotary positioner is provided in the apparatus of FIG. 1. However, a magnetic data embedding apparatus of the invention may generally have two or more sets of functional sections for a checking side containing a checking-dedicated rotary positioner that performs as described above.

Figure 3:
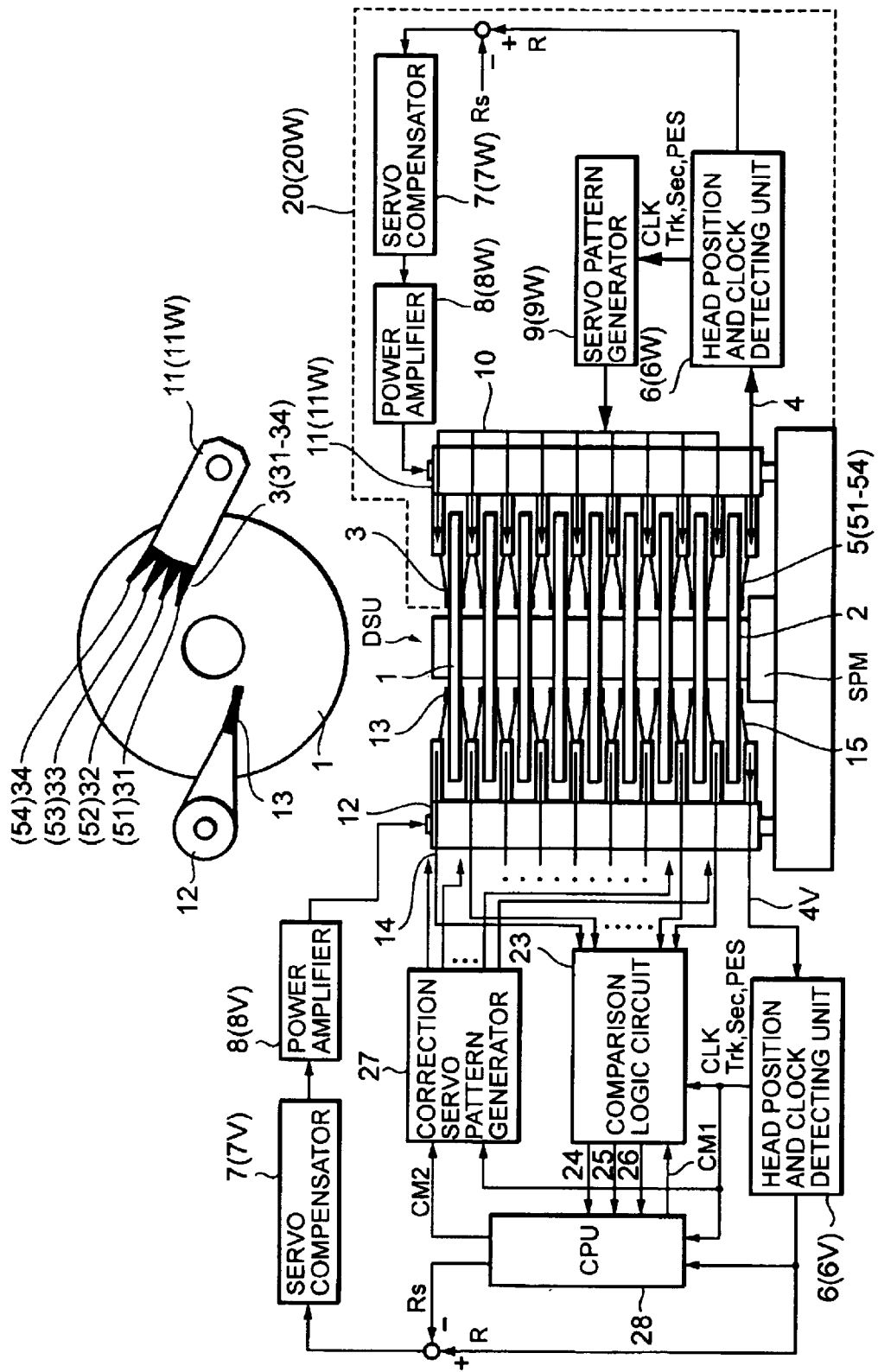
FIG. 3 shows a structure of a magnetic data embedding apparatus having checking function of second embodiment of the invention.

FIG. 3 shows a structure of a second embodiment of a magnetic data embedding apparatus having a checking function according to the invention. The essential difference between the magnetic data embedding apparatus of FIG. 3 and the corresponding apparatus of FIG. 1 is that the apparatus of FIG. 3 has one writing side rotary positioner 11W rather than the two rotary positioners 11A and 11B. The rotary positioner 11W in FIG. 3 has a plurality of read magnetic heads 5 (four in this example, 51 through 54) arranged along a nearly radial direction at regular intervals on the master disk 2 for access thereto. The rotary positioner 11W also has the same number of servo heads 3 (four in this example, 31 through 34) for each surface of the magnetic disks 1, arranged along nearly radial direction at regular intervals on the magnetic disk surfaces, for access thereto. The read magnetic heads 5 and the servo heads 3 are integrally stacked and pivotally supported on the rotary positioner 11W.

The read magnetic head 5i opposing a surface of the master disk 2 and the servo heads 3i opposing respective surfaces of the magnetic disks 1, are attached to the rotary positioner 11W such that every head accesses the position of the same radius on the master disk 2 and the magnetic disks 1. Here "i" is a general suffix representative of the specific suffix 1, 2, 3, 4 for identifying the specific read magnetic heads 5 and the servo heads 3.

In FIG. 3, the head position and clock detecting section 6W detects the servo information in the magnetic data 4 that is read out by the four read magnetic heads 5i. The servo pattern generator 9W receives the servo information and generates a servo pattern for each of the four servo heads 3i on each of the magnetic disks. A servo pattern is written on the respective surfaces of the magnetic disks 1 by the corresponding servo heads 3i.

The head position and clock detecting section 6W detects a detected head position R that is an actual radial position on the master disk 2 of one read magnetic head, for example, read magnetic head 51, selected beforehand from among the read magnetic heads 51 through 54. The rotary positioner 11W is controlled and pivoted through the servo compensator 7W and power amplifier 8W so that the read magnetic head 51 follows up the track corresponding to the target head position Rs. Write operations for the servo pattern on each magnetic disk surface are executed simultaneously by a plurality of servo heads, four servo heads 31 through 34 in this example.

Although the same number of read magnetic heads 5 as the number of the servo heads 3 is provided in the apparatus of FIG. 3, the number of the read magnetic head 5 can be only one. For example, in such a case only the read magnetic head 51 that is used for following up the track is provided. In that case, there is appended a means that receives the servo information from the actually existing read magnetic head 51, and generates other servo information corresponding to virtual read magnetic heads 52, 53, and 54 by transforming the servo information from the read magnetic head 51. The generated servo information is fed to the servo pattern generator.

In summary, as has been described, a magnetic data embedding apparatus having a checking function according to the invention comprises a master magnetic disk and a plurality of object magnetic disks that are stacked on a shaft of a spindle motor. The apparatus also comprises one or more read magnetic heads disposed on the master disk and a plurality of servo heads disposed on every surface of the object disks. The plurality of servo heads write embedded data based on the magnetic data that is read out from the master disk by the read magnetic head onto the surface of the object magnetic disk in parallel while sharing a range of tracks.

The apparatus further includes one, or a defined plurality of checking magnetic heads disposed on one surface of the master disk and every surface of the object disks. The checking magnetic head disposed on the master disk reads the magnetic data on the master disk. The checking magnetic heads disposed on the object disks read the embedded data on the corresponding surface of the object disks, while the servo heads are writing embedded data on the object disks. The magnetic data read out from the master disk is compared with the embedded data read out from the object disks, and errors, if any, are corrected.

Thus, the contents in the master disk can be exactly written on every object magnetic disks. Moreover, the total time required by the processes from start of writing to end of checking can be reduced.

What is claimed is:

1. A magnetic data embedding apparatus having a checking function comprising:

a spindle motor having a shaft;

a master magnetic disk with magnetic data containing servo information written on at least one surface thereof and a plurality of object magnetic disks in which information is written, the master disk and the object magnetic disks being stacked and integrally installed on the shaft of the spindle motor;

a plurality of rotary positioners disposed around the magnetic disks, each stacking and holding integrally and pivotally a plurality of magnetic heads, the plurality of rotary positioners including first and second write-dedicated rotary positioners, and a checking-dedicated rotary positioner, the first write-dedicated rotary positioner having a first read magnetic head and a plurality of first write magnetic heads, the first read magnetic head reading out the magnetic data on the master disk, the first write magnetic heads including a first write magnet head corresponding to each object magnetic disk surface of the object magnetic disks stacked on the shaft of the spindle motor for accessing said each object magnet surface, the second write-dedicated rotary positioner having a second read magnetic head and a plurality of second write magnetic heads, the second read magnetic head reading out the magnetic data on the master disk, the second write magnetic heads including a second write magnet head corresponding to each object magnetic disk surface of the object magnetic disks stacked on the shaft of the spindle motor for accessing said each object magnet surface, wherein each of the first write magnetic heads writes the magnetic data that is read out by the read magnetic head disposed on the master magnetic disk or magnetic data made from the magnetic data that is read out from the master disk (hereinafter the two types of magnetic data are collectively referred to as embedded data) onto said each first object magnet surface of the object magnetic disk to which the first write magnetic head corresponds, in such a way that the second write magnetic head corresponding to the same surface of the object magnetic disk and writes the embedded data in parallel while sharing a range of tracks, the plurality of rotary positioners further including a checking-dedicated rotary positioner stacking and holding integrally and pivotally a first type checking head and second type checking heads, the first type checking head reading out the magnetic data on the master disk for checking, and each of the second type checking heads being provided corresponding to one surface of the object magnetic disks for checking and reading out the embedded data corresponding to the magnetic data that is read out from the master disk by the first type checking head; and respective comparison means, corresponding to each surface of the object magnetic disks for comparing the embedded data read out from the surface of the object magnetic disk by the second type checking head with the magnetic data that is read out by the first type checking head simultaneously with writing operations of the first and second write magnetic heads.

2. A magnetic data embedding apparatus having a checking function according to claim 1, further comprising an overwriting means that overwrites onto the object magnetic disks, the embedded data corresponding to the magnetic data that is read out by the first type checking head, through the second type checking heads disposed on the surfaces of the object magnetic disks when the comparison means detects an inconsistency, simultaneously with the writing operation of the first and second write magnetic heads.

3. A magnetic data embedding apparatus having a checking function comprising:

a spindle motor having a shaft;

a master magnetic disk with magnetic data containing servo information written on at least one surface thereof and a plurality of object magnetic disks in which information is written, the master disk and the object magnetic disks being stacked and integrally installed on the shaft of the spindle motor;

a plurality of rotary positioners disposed around the magnetic disks, each stacking and holding integrally and pivotally a plurality of magnetic heads, the plurality of rotary positioners including a write-dedicated rotary positioners, and a checking-dedicated rotary positioner, the write-dedicated rotary positioner having a plurality of read magnetic heads and a plurality of write magnetic heads, the read magnetic heads reading out the magnetic data on the master disk, the write magnetic heads including plural write magnet heads corresponding to each object magnetic disk surface of the object magnetic disks stacked on the shaft of the spindle motor, for accessing said each object magnet surface, wherein for each of the object magnet disk surfaces of the stack, each of the write magnetic heads corresponding thereto writes in parallel while sharing a range of tracks magnetic data read out by the read magnetic heads disposed on the master magnetic disk or magnetic data made from the magnetic data that is read out from the master disk (hereinafter the two types of magnetic data are collectively referred to as embedded data), the plurality of rotary positioners further including a checking-dedicated rotary positioner stacking and holding integrally and pivotally a first type checking head and second type checking heads, the first type checking head reading out the magnetic data on the master disk for checking, and each of the second type checking heads being provided corresponding to one surface of the object magnetic disks for checking and reading out the embedded data corresponding to the magnetic data that is read out from the master disk by the first type checking head; and respective comparison means, corresponding to each surface of the object magnetic disks for comparing the embedded data read out from the surface of the object magnetic disk by the second type checking head with the magnetic data that is read out by the first type checking head simultaneously with writing operations of the write magnetic heads.

4. A magnetic data embedding apparatus having a checking function according to claim 3, further comprising an overwriting means that overwrites onto the object magnetic disks, the embedded data corresponding to the magnetic data that is read out by the first type checking head, through the second type checking heads disposed on the surfaces of the object magnetic disks when the comparison means detects an inconsistency, simultaneously with the writing operation of the first and second write magnetic heads.

* * * * *